D. TRUE.

SOCKET FOR BOAT KNEES.

No. 10,345. Reissued June 19, 1883.

WITNESSES

Joseph Ashbaugh.

Irving H. Baker.

INVENTOR

David True.

By his Atty.,

Henry W. Williams

N. PETERS, Photo-Lithographer, Washington, D. C.

UNITED STATES PATENT OFFICE.

DAVID TRUE, OF SALISBURY, MASSACHUSETTS.

SOCKET FOR BOAT-KNEES.

SPECIFICATION forming part of Reissued Letters Patent No. 10,345, dated June 19, 1883.

Original No. 176,901, dated May 2, 1876. Application for reissue filed May 16, 1883.

*To all whom it may concern:*

Be it known that I, DAVID TRUE, of Salisbury, in the county of Essex and State of Massachusetts, have invented certain new and useful Improvements in Sockets for Boat-Knees, of which the following is a specification.

This invention relates particularly to sockets used in connection with knees for dories and similar craft.

The nature of the invention consists, first, in making a boat-knee socket with whole top and sides and open bottom—in other words, a bottomless socket; second, in making a partition at or near the center of the socket; and, third, in providing one or more projections or ribs within the socket, fitting into corresponding openings in the timbers forming the knee.

The nature and objects of my invention are described in detail below.

Figure 1:
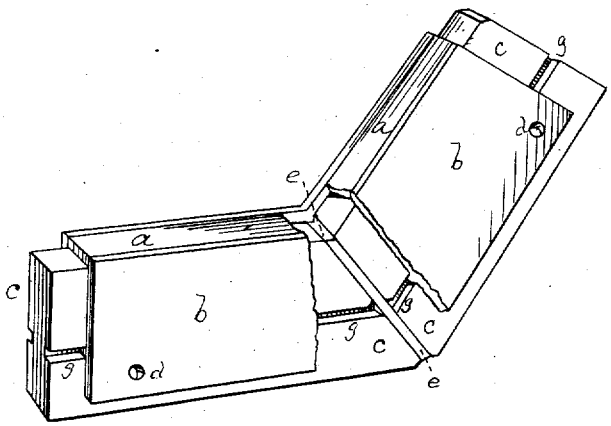
Figure 2:
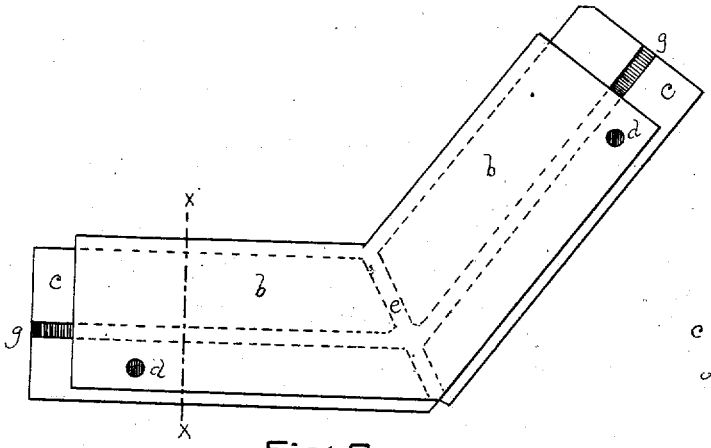
Figure 3:
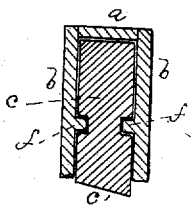

In the accompanying drawings, in which similar letters of reference indicate like parts, Figure 1 is a view in perspective of a dory boat-knee and socket embodying my invention. A portion of the center of the socket is represented as having been broken out in order to more clearly exhibit the invention. Fig. 2 is a side elevation of the same. Fig. 3 is a transverse vertical section.

*a* represents the top, and *b b* the sides, of my improved socket. The bottom is entirely open. *c c* are the two timbers forming the boat-knee, riveted into the socket by means of the openings *d d* in the side of the socket. It will readily be perceived that inasmuch as the flat bottom of a dory gradually inclines upward from the center toward the bow and stern, all the knees excepting the center ones do not have a perfectly horizontal surface upon which to rest. Therefore, in order that the knees may assume a perpendicular or vertical position, their under sides or bottoms must be beveled to suit the angle of that portion of the boat-bottom upon which they rest. This angle grows greater as it nears the two ends of the boat. Now, in order that a single socket may accommodate itself to any portion of the boat, the bottom is left open, and the knee is made wide enough to project a short distance through the bottom of the socket, as seen in the drawings, and then the bottom of the knee may be beveled at any angle desired, as exhibited at *c'*, Fig. 3, without interfering with the socket. *e* is a partition dividing the socket into two parts. The socket is rendered much stronger and less liable to spread by means of this partition, and the soft wood *c*, when driven into the socket, is provided with a hard solid substance to rest against, which would not be the case if no partition were provided and each piece *c* were driven against the piece entering from the opposite side, both being more or less soft. In order to strengthen the socket still more, and also to hold the knee in place, the casting is provided with one or more ribs, *f*, fitting into the corresponding grooves, *g*, in the timber *c*.

In practical operation the two timbers *c c* are driven into the socket into the positions shown in the drawings, and held in place by means of the grooves *g* and rivets through openings *d*. Having been beveled to fit its position in the boat, it is nailed to the bottom in the usual manner. Of course that portion of the knee which rests against the side of the boat may be beveled to fit its position.

Having thus fully described my invention, what I claim, and desire to secure by Letters Patent, is—

1. A socket or clamp for holding the inner ends of two portions of a boat-knee, consisting of sides and top extending from side to side, but without complete bottom, for the purpose of allowing the bottom of said boat-knee to be beveled to fit its position in the boat.

2. In a socket or clamp for holding the inner ends of two portions of a boat-knee, the combination, with said clamp and portions, of a partition placed between the adjacent or inner ends of said portions for said ends to abut against, substantially as described.

3. In a boat-knee, the combination, with the timber thereof, of a plate or socket extending across the bend in the knee, and provided on each side of said bend with one or more projections substantially integral with said plate or socket and extending into corresponding openings in said timber, for the purpose specified.

4. In combination with the timber *c*, provided with the groove *g*, side plates, *b*, provided with the ribs *f*, substantially as and for the purpose above set forth.

DAVID TRUE.

Witnesses:

GEORGE W. CATE,

FRANK R. WHITCHER.